Oct. 25, 1966  W. H. BINYON  3,280,503
DISPLAY AND WATER CONTAINER ASSEMBLAGE
Filed March 9, 1964
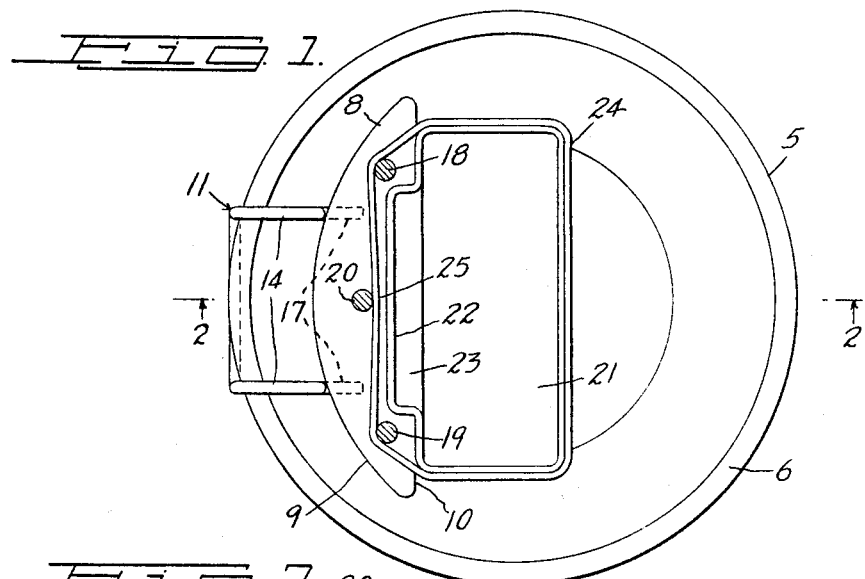
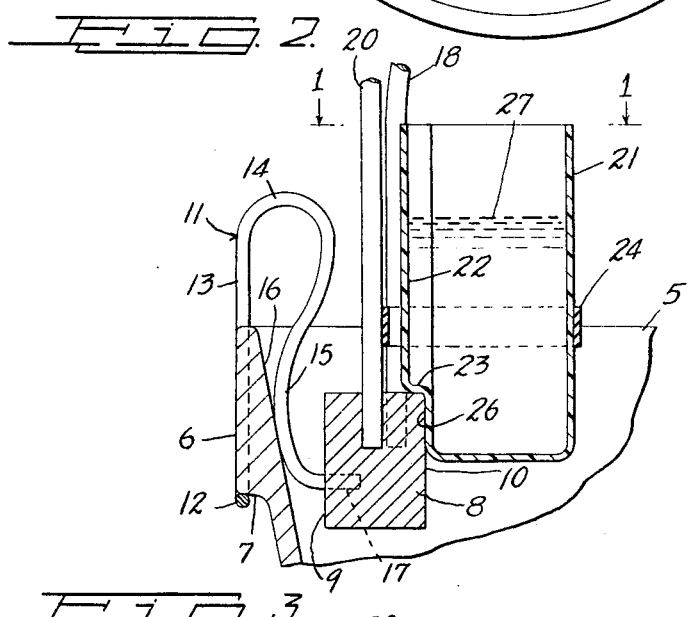
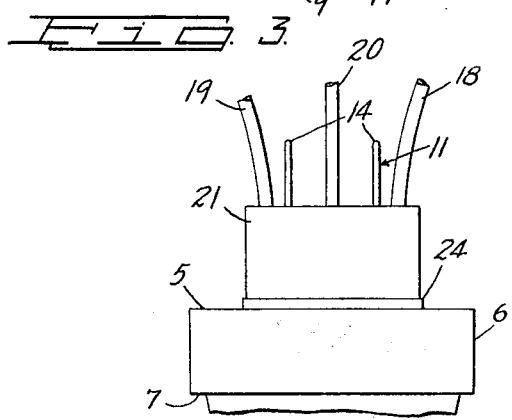
INVENTOR.
WALTER H. BINYON
BY
Howard E. Thompson
ATTORNEY

3,280,503
DISPLAY AND WATER CONTAINER ASSEMBLAGE

Walter H. Binyon, 32 Franklin St., Cedar Grove, N.J.
Filed Mar. 9, 1964, Ser. No. 350,356
5 Claims. (Cl. 47—41)

This invention relates to what I term a display assemblage having means for mounting the same in connection with a conventional flower pot or similar holder and, particularly, where the assemblage includes means for supporting a water container thereon, so that predetermined parts of a floral display can maintain a constant source of water supply to keep them fresh, while the rods extending from the assemblage are utilized in support of flowers and other floral portions in a predetermined and desired arrangement, keeping in mind that portions of the overall display may extend upwardly with respect to the earth in a pot and, in normal procedure, this support provides the normal means for retaining such portions of the display in healthy conditions at all times.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional plan view of an assemblage arranged upon a pot, the section being generally on the line 1—1 of FIG. 2.

FIG. 2 is a partial section on the line 2—2 of FIG. 1; and

FIG. 3 is a diagrammatic face view of the upper portion of the pot and illustrating, in part, the floral support rods of the display.

In illustrating one adaptation and use of my invention, I have shown in the drawing at 5 a common flower pot, which may be formed of any type or kind of material and, for this reason, no special sectioning is illustrated in FIG. 2 of the drawing. The upper open end portion of the pot includes an enlarged collar portion 6, shown in section in FIG. 2 of the drawing, and at the lower end of this collar portion is formed an annular shoulder 7.

The assemblage comprises a block 8 of any suitable material having a rounded outer surface 9, generally conforming to the contour of the interior of the pot and a straight inner surface 10. At 11 is shown a spring clip for attachment of the block 8 with the upper enlarged portion 6 of the pot. The clip comprises a horizontally straight central crosshead portion 12, having upwardly extending spaced parallel ends 13 terminating in upper spring loops 14. Extending downwardly from the loops 14 are curved spring arms 15 convexed in the direction of said parallel ends 13 and adapted to tensionally engage the inner surface 16 of the pot, as clearly illustrated in FIG. 2 of the drawing. The arms 15 terminate in angularly extending portions 17 mounted in suitable apertures in the block 8. The upper surface of the block 8 has a plurality of vertical apertures for the mounting of a plurality of rods 18, 19 and 20 therein, three only being shown in the present illustration. These rods project upwardly from the upper surface of the pot and are of sufficient length to provide the desired display and arrangement. In the present showing, the rods are illustrated as being of a common diameter. However, rods of different diameters can be employed. These rods can be formed of any suitable and preferably rust-proof material capable of being bent or flexed in several directions to produce the desired arrangement of a display. Also mounted in these rods can be means for attaching the various portions of the floral display thereto, such as hook fasteners or multiple loop display devices, as illustrated in companion applications filed by me of equal date herewith. From this standpoint, no specific illustration of such devices is made in the accompanying drawing. It should be pointed out, at this time, that, in some instances, the floral display can be directly coupled with the rods, apart from such other fasteners or devices by means well-known in the art. In connection with the foregoing, I have found that aluminum rods are practical for the intended purpose, that is to say, rods such as aluminum rivet rods.

The assemblage, as above described, can be shipped as such in various arrangements but, when parts of the arrangement are formed of artificial floral displays producing a background showing, in some instances, it is desirable to position in the display live cut flowers which should be kept in healthy state. For this purpose, I employ in the assemblage a water container 21, again preferably from a rust-proof material and, in the construction shown, a plastic container has been illustrated. The container is generally oblong and rectangular in form and includes on one long side thereof an outwardly offset portion 22, forming, at its base, a flange 23 which is adapted to rest upon the upper surface of the block 8, as diagrammatically seen in FIG. 2 of the drawing. For maintaining the container in proper position, I employ a supporting band 24, preferably of rubber, which is passed around the peripheral walls of the container and around the rods 18 and 19 and forwardly of the rod 20, as seen at 25 in FIG. 1 of the drawing. This band supports the rear surface 26 of the lower portion of the container firmly upon the surface 10 of the block 8 to, at all times, maintain the container in rigid upright position, as diagrammatically shown. At 27 I have diagrammatically illustrated the level of water arranged in the container, into which cut flowers or the like can be placed for maintaining them in healthy state.

In the showing in FIG. 3 of the drawing, it will be apparent that, in this figure, the rods 18 and 19 are illustrated in a partially bent or flexed position. However, upper extended end portions of these rods can be shaped in any desired manner for producing a desired arrangement in the overall display and, while the rod 20 is shown in an upright position, here again, upper portions of this rod can be bent or flexed in different directions in providing the desired arrangement to be produced.

As previously stated, the pot 5 may contain earth for the support and maintenance of plant life. No illustration of this earth is shown, as it will be quite apparent to those skilled in the art but, when so used, the earth will extend to a point in alinement with or possibly slightly above the upper surface of the block 8, so as to leave sufficient room at the top of the pot for admission of water in periodically moistening such earth.

By employing the spring clip on the assemblage, the entire assemblage can be coupled and uncoupled with respect to a support, such as the pot, whenever desired. The contour of this clip can be designed to adapt its use in connection with various types and kinds of supports, it being understood that engagement with the support is controlled between the arm 15 and the side members 13 including the horizontal crosshead 12.

Having fully described my invention, what I claim as new and desire to secure by Letters Patent is:

1. A display assemblage comprising a block, a spring clip for mounting the block in connection with a support, a plurality of rods mounted in and projecting from the upper surface of the block, said rods being formed of bendable material for support in conjunction with the assemblage of a predetermined floral arrangement, the assemblage including a container, means for support of the container on the block and in conjunction with at least part of said rods, said container including an offset wall portion overlying an upper surface of said block, and the base of the offset portion including a flange seating on said block.

2. An assemblage as defined in claim 1, wherein said container is composed of rustproof material.

3. A display assemblage comprising a block having a rounded surface, a spring clip coupled with the rounded surface of the block for mounting the block in connection with a support, the major portion of the clip extending above an upper surface of the block, a plurality of rods mounted in and projecting from the upper surface of the block, said rods being formed of rustproof material capable of manual flexing in several directions for support of a predetermined floral arrangement in conjunction with the assemblage, said assemblage including a container, and means on the container operatively engaging at least part of said rods for support of said container on said block.

4. An assemblage as defined in claim 3, wherein the container includes means seating on the upper surface of the block for vertical positioning of said container in the assemblage.

5. A display assemblage comprising a block having a rounded surface, a spring clip coupled with the rounded surface of the block for mounting the block in connection with a support, the major portion of the clip extending above an upper surface of the block, a plurality of rods mounted in and projecting from the upper surface of the block, said rods being formed of rustproof material capable of manual flexing in several directions for support of a predetermined floral arrangement in conjunction with the assemblage, the support for said assemblage comprising a pot having an enlarged collar portion at its upper end, said spring clip including a crosshead portion operatively engaging a lower surface of said collar in retaining the clip against displacement from said collar, said spring clip including upper spring loops joining the crosshead in parallel portions, said loops having downwardly extending arms convexly curved in the direction of said parallel portions, and said arms having terminal angularly extending ends fixed in said block.

References Cited by the Examiner

UNITED STATES PATENTS

| 500,140 | 6/1893 | Kruger | 47—47 |
| 796,214 | 8/1905 | Hughes | 47—47 |
| 2,083,678 | 6/1937 | Wilson | 47—47 |
| 2,917,868 | 12/1959 | Presnick | 47—47 |

FOREIGN PATENTS 22,803    10/1956    Germany.

ABRAHAM G. STONE, *Primary Examiner.*

J. R. OAKS, *Assistant Examiner.*